United States Patent
de Queiroz

(10) Patent No.: US 6,563,955 B2
(45) Date of Patent: *May 13, 2003

(54) METHOD AND APPARATUS FOR ANALYZING IMAGE DATA TO USE MULTIPLE TRANSFORMS FOR ENHANCED IMAGE DATA TRANSMISSION

(75) Inventor: Ricardo L. de Queiroz, Pittsford, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,355

(22) Filed: Nov. 13, 1998

(65) Prior Publication Data

US 2001/0041017 A1 Nov. 15, 2001

(51) Int. Cl.[7] .................................................. G06K 9/36
(52) U.S. Cl. ....................................... 382/239; 382/250
(58) Field of Search .......................... 382/239, 234–251, 382/253; 358/462; 348/405, 420, 399, 422; 393/422; 375/240.01

(56) References Cited

U.S. PATENT DOCUMENTS

| 5,341,441 A | | 8/1994 | Maeda et al. | .................. 382/56 |
| 5,602,589 A | * | 2/1997 | Vishwanath et al. | ......... 348/398 |
| 5,642,438 A | | 6/1997 | Babkin | ........................ 382/250 |

(List continued on next page.)

FOREIGN PATENT DOCUMENTS

| EP | 0 269 746 A | 6/1988 |
| EP | 0 750 426 A | 12/1996 |
| EP | 0 856 988 A | 8/1998 |
| WO | WO 97 37327 A | 10/1997 |

OTHER PUBLICATIONS

Chaddha, N. et al.: "Joint Image Classification and Compression using Hierarchical Table–Lookup Vector Quantization", Data Compression Conference 1996; DCC '96 Proceedings Snowbird, UT, USA, Mar. 31, 1996–Apr. 3, 1996, Los Alamitos, CA, USA, IEEE Comput Soc. US, Mar. 31, 1996, pp. 23–32, XP010156543, ISBN: 0–8186–7358–3 *the whole document*.

Panos Nasiopoulos et al.: "Adaptive Compression Coating", IEEE Transactions on Communications, IEEE Inc. New York, US, vol. 39, No. 8, Aug. 1, 1991, pp. 1245–1254, XP000264286, ISSN: 0090–6778 *the whole document*.

Oehler K. L. et al., "Combining Image Compression and Classification Using Vector Quantization", IEEE Transactions on Pattern Analysis and Machine Intelligence, IEEE Inc. New York, US, vol. 17, No. 5, May 1, 1995, pp. 461–473, XP000505707, ISSN: 0162–8828, *p. 461–p. 464*.

Gray, R.M. et al.: "Vector Quantization and Density Estimation", Compression and Complexity of Sequences 1997. Proceedings Salerno, Italy, Jun. 11–13, 1997, Los Alamitos, CA, USA, IEEE Comput. Soc, US, Jun. 11, 1997, pp. 172–193, XP010274924, ISBN: 0–8186–8132–2 *p. 179*.

*Primary Examiner*—Jingge Wu
(74) *Attorney, Agent, or Firm*—Michelle W. Waites; Mark Z. Dudley

(57) ABSTRACT

A method and apparatus for compressing digital image data to improve the efficiency of serial data transmission is disclosed. More specifically, the present invention accomplishes image transmission by providing multiple image processing modules, and then selecting the module that will process the entire in the most efficient manner, based upon the content of the data contained in the image. Image content is analyzed using hierarchical vector quantization.

16 Claims, 8 Drawing Sheets

U.S. PATENT DOCUMENTS

| | | | |
|---|---|---|---|
| 5,699,170 A | | 12/1997 | Yokose et al. ............... 358/426 |
| 5,699,457 A | | 12/1997 | Adar et al. ................. 382/239 |
| 5,701,368 A | * | 12/1997 | Jung .......................... 382/239 |
| 5,748,249 A | * | 5/1998 | Fujiwara .................... 348/419 |
| 5,926,226 A | * | 7/1999 | Proctor et al ............... 382/253 |
| 6,058,217 A | * | 5/2000 | Kondo ....................... 382/239 |
| 6,195,128 B1 | * | 2/2001 | Streater ..................... 382/237 |
| 6,198,768 B1 | * | 3/2001 | Yamguchi et al. ....... 375/240.1 |

* cited by examiner

METHOD AND APPARATUS FOR ANALYZING IMAGE DATA TO USE MULTIPLE TRANSFORMS FOR ENHANCED IMAGE DATA TRANSMISSION

The present invention is directed to a method and apparatus for compressing digital image data such that data transmission speed matches the speed of an associated modem. More specifically, the invention accomplishes image transmission by implementing multiple compressors, each of which compresses image data to achieve a different output image quality level. Throughout transmission, the invention continues to send the image data to the compressor that will process it such that an appropriate level of image quality will be retained, while simultaneously outputting it at a speed that will result in efficient serial data transmission.

BACKGROUND OF THE INVENTION

The transmission of electronic data via facsimile machines and similar devices has become quite common, and efforts to transmit significantly larger volumes of this data within equal and even substantially shortened periods of time are constantly being made. This is true not only to allow data to be sent from one location to another at faster speeds and thereby cause less inconvenience to the user, but to enable more complex data to be transmitted between the same locations without drastically increasing the required transmission time. For example the facsimile transmission time for a detailed halftoned image will be many times more than that of a simple sheet of black text on a white page when using the same fax machine. By the same token, fax transmission of a color image will require an even greater amount of time than its greatly detailed halftoned counterpart.

The "sending" portion of fax transmission includes scanning the original image and generating a corresponding digital image thereof, followed by serial transmission of digital image data to a receiving fax machine. Without any form of data reduction, transmission of color image data files via facsimile would require extensive resources—very fast modems and/or large buffers—and would still take a great deal of time, thereby causing such transmission to become very expensive and therefore, impractical. Thus, some form of data compression is typically employed prior to fax transmission of color image data.

The JPEG (Joint Photographic Experts Group) standard provides a well known method of compressing electronic data. JPEG uses the discrete cosine transform (DCT) to map spatial data into spatial frequency domain data. Briefly, first JPEG requires transforming an 8×8 block of pixels into a set of 8×8 coefficients using the DCT to produce a DC coefficient (DCC), and a set of AC coefficients (ACCs). The DCC and ACCs are quantized, rounded to the nearest whole number and arranged in a one dimensional vector which is encoded into a bit stream.

Because color image data is so complex, ordinary data compression schemes require high compression ratios to be applied in order to complete the transmission within an acceptable time frame. Higher compression ratios lead to more data loss, typically at the higher end of the frequency range.

Successful fax transmission requires a proper correspondence between the compression ratio being applied to the image and the CPU speed of the sending fax machine. In other words, if the compression ratio is smaller than necessary for a given CPU speed, the CPU will have to be slowed down, or the data will have to wait to be transmitted and an appropriately sized buffer will be required. On the other hand, high compression levels mean that very few bits will be generated and less data will have to be sent through the modem. If the compression ratio is high relative to the CPU speed the modem will become idle waiting for the CPU to complete image processing and transmit more data. Since modems are typically configured to detect a large lapse in data transmission as the end of transmission, this large idle time typically causes the modem to disconnect. Thus, it is advantageous to continue the stream of data from the sending fax machine to the receiving fax machine, and eliminate gaps in the data stream. One way to do this is obviously to implement a faster JPEG compressor which can keep the data moving through the modem even if a high compression ratio is used. However, this solution results in significant cost increases and may be impractical.

One way to maintain proper compression ratio to clock speed correspondence is to provide multiple compressors to which portions of the digital image data may be transmitted. If the portion of the image being processed contains a lot of pictorial or other data that requires high quality reproduction, that data should be processed by the compressor which will provide the best image quality. However, if the portion of the image being processed contains text or other data that does not require high quality reproduction, that image data can be routed to a compressor that will produce a lower quality output to benefit from the fact lower quality output can be produced by the compressor at a much faster processing speed. In fact when text or other simple data is being processed, differences between image quality that is produced by a high quality output producing processor and that produced by a lower quality output producing processor will hardly be noticed by the human eye.

All pixels, and therefore blocks of pixels, are defined using a certain number of bits. In an image processing operation known as vector quantization (VQ), a block of X×Y pixels is mapped to a single "codeword" which is defined using a smaller number of bits than the number required by the original block. Codewords are stored in transmitting, receiving and storage devices, and each codeword is associated with a pre-defined set of image data. The codeword to which each pixel block is mapped is that which is associated with image data that most closely matches the image data in the pixel block. The typical process includes mapping the pixel block to a codeword, storing the codeword or transmitting it to a receiving device, and then mapping the codeword back to image data when it is retrieved from storage or received at the receiving device. Since codebook storage and codeword transmission require less space and time than storage and transmission of original image data, this process greatly reduces the resources required to reproduce the original image data.

There are typically many more combinations of pixel blocks than there are available codewords, and as indicated by the term "quantization" several input blocks can be mapped to a single codeword. For a fixed number of codewords, increasing the size of the pixel block reduces the quality of mapping and reconstruction since more actual image data must be mapped to the same number of codewords. Some drawbacks of VQ are that codebook design is often very complex, and that large amounts of time are usually required to search through the codebook and to match blocks to the appropriate codeword. While codebook design can be performed off-line, block matching searches must be performed on-line.

In hierarchical vector quantization (HVQ), block matching searches are performed two samples at a time. Thus, look up tables (LUTs) can be used directly to perform HVQ in two or more stages. In the first stage, two image pixels are mapped to one codeword, reducing the number of samples by a factor of 2. In the next stage, the process is repeated to map pairs of codewords to single codewords. Preferably, codewords are grouped in a direction perpendicular to the one used for the previous level. As the process continues, the resulting codewords are mapped to larger and larger amounts of data.

HVQ allows for a rough approximation of the content of each image block using simple look-up table operations. The final codeword represents a block approximation and can, therefore be directly mapped to other quantities which describe certain characteristics of the approximated block, such as block activity. HVQ codebook design methods follow standard VQ codebook design algorithms and is usually performed by designing the codebooks for a single stage at a time.

The following disclosures may be relevant to aspects of the present invention:

U.S. Pat. No. 5,699,457 to Adar et al. issued Dec. 16, 1997 discloses a method of bit rate control and block allocation for discrete cosine transform (DCT) image signal compression includes the steps of (a) partitioning the image signals in blocks representing portions of the total image, (b) calculating DCT coefficients for image data in all blocks, (c) obtaining a measure of block activity (BACT) for each block based on DCT coefficients and for the total image activity (ACT) as a sum of the measures of all block activity, and (d) determining a code allocation factor (AF) for each block based on the ratio of block activity (BACT) to target code volume (TCV data) for the coded image data. The method also includes (e) allocating bits for each block using the allocation factor (AF) for each block and the target code volume (DCV data).

U.S. Pat. No. 5,699,170 to Yokose et al. issued Dec. 16, 1997 discloses an image communication system wherein transmission of an image between an image transmission apparatus and an image reception apparatus which include image output sections having different performances can be performed without making an inquiry for the performance prior to transmission. An image is inputted by an image input section and sent to a hierarchization section in the image transmission apparatus. The hierarchization section converts the inputted image into hierarchic communication data and transmits hierarchized data to a selection section of the image reception apparatus. The selection section extracts only necessary data from the hierarchic communication data transmitted thereto in accordance with the performance of an image output section of the image reception section and then sends the necessary data to the image output section after, if necessary, they are converted into image data. The image output section visualize the image data transmitted thereto from the selection section.

U.S. Pat. No. 5,642,438 to Babkin issued Jun. 24, 1997 discloses image compression implementing a fast two-dimensional discrete cosine transform. More specifically, Babkin discloses a method and apparatus for the realization of two-dimensional discrete cosine transform (DCT) for an 8×8 image fragment with three levels of approximation of DCT coefficients.

U.S. Pat. No. 5,341,441 to Maeda et al. issued Aug. 23, 1994 discloses method and apparatus for coding image information, and a method of creating code books. A coding apparatus divides digital image information into pixel blocks each having a size of M×N pixels, and subjects the image information to vector quantization in block units. The pixel blocks are orthogonally transformed and the characteristics and sequency components of the pixel blocks are detected. Each pixel block is divided into a plurality of sub-blocks in conformity with the detected sequency components. Respective ones of the plurality of divided and outputted sub-blocks are scalar-quantized into sub-vectors of a predetermined number of bits in conformity with the characteristics of the pixel blocks. Respective ones of the scalar-quantized values of the quantized sub-blocks are vector-quantized in conformity with the characteristics of the pixel blocks, these vector-quantized reproduction vector codes are combined and the result is subjected to further vector quantization.

Pending U.S. Ser. No. 09/075,935 filed on May 12, 1998 by Ricardo L. de Queiroz and assigned to the assignee of the present invention discloses an encoding and/or decoding method and apparatus which incorporates decoding commands into a compressed file. The decoding commands are instructions carried along to a decompressor and implement processing performed in the compressed domain. Then, the decompressor processes the data while decompressing it. This reduces the computation time for imaging operations.

Pending U.S. Ser. No. 09/119,023 filed on Jul. 20, 1998 by Ricardo L. deQueiroz and assigned to the assignee of the present application discloses a method and apparatus for compressing digital image data to improve the efficiency of serial data transmission. The invention accomplishes image compression by performing the most complex portions of a standard compression technique on a smaller amount of data than the usual 8×8 block of image data. The invention includes a fast JPEG compressor based on a modified two-dimensional discrete cosine transform.

Pending US Patent Applications identified by attorney docket numbers D/98011 and D/98011Q to deQueiroz et al. entitled "Method and Apparatus for Using Multiple Transforms to Fill a Buffer for Enhanced Image Data Transmission" and "Apparatus for Using Multiple Transforms to Fill a Buffer for Enhanced Image Data Transmission" both assigned to the assignee of the present invention disclose methods and apparatus' for compressing digital image data to improve the efficiency of serial data transmission. More specifically, the invention uses a buffer to hold processed image data until the modem is ready to transmit it. The amount of image data residing in the buffer is continuously checked, and one of several image processing modules is selected to process the data based upon the volume of data that resides in the buffer.

All of the references cited herein are incorporated by reference for their teachings.

Accordingly, although known apparatus and processes are suitable for their intended purposes, a need remains for a method and apparatus that can efficiently process digital image data and improve the efficiency of serial data transmission.

SUMMARY OF THE INVENTION

In accordance with one aspect of the invention there is provided a method of improving the speed and efficiency of electronic data transmission, which includes the steps of acquiring input image data which represents the light intensity of an image; segmenting the input image data to form a plurality of image data blocks; selecting, based on an image content, a module for receipt of an input image data block; and processing the received image data block in the module.

In accordance with another aspect of the invention, module selection in a method of improving the speed and efficiency of electronic data transmission includes obtaining an image data block; mapping the image data block to a single codeword using at least one look up table; and transmitting the image data block to a module which has been designated by the single codeword.

In accordance with yet another aspect of the invention there is provided an apparatus for improving the speed and efficiency of electronic data compression, which includes a segmenter which divides image data into a plurality of input image data blocks, wherein the image data corresponds to the light intensity of an original image; a plurality of image processing modules communicating with the segmenter, wherein any of the modules may process the segmented image data blocks; and an image analyzer communicating with the input image data blocks and with the modules to designate one of the modules for processing of a segmented image data block, based upon a content of the segmented image data block.

In accordance with still another aspect of the invention the image analyzer of an apparatus for improving the speed and efficiency of electronic data transmission includesan input data mapping device which maps each image data block to one codeword using a look up table; and a director which transmits the image data block to a module which has been designated by the single codeword.

The present invention deals with a common problem in digital image processing systems—obtaining an effective yet cost efficient way to supply a continuous stream of complex image data from a sending fax machine to a receiving fax machine. One way to solve this problem includes using multiple compressors each having different data compression rates, and selecting the appropriate compressor for processing blocks of the image data based upon the content contained therein. Specifically, if the activity in the block is low—there are few variations between pixel values in a single block, the image data will be processed by a module that processes data at a relatively high speed, even though some image quality may be lost. If block activity is high the data will be processed by the module that will produce the best image quality, albeit at a slower speed. While some areas of the original document will be reproduced at a lesser accuracy level, the overall quality of the output fax will be sufficient for most purposes.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for compressing complex digital image data to enhance the efficiency of data transmission. More specifically, the invention includes multiple data compressors, each of which operates at a different compression rate. The content of the blocks into which the image has been separated is continuously checked and the module that would be most appropriate for processing the data is then selected based upon that content.

Figure 1:
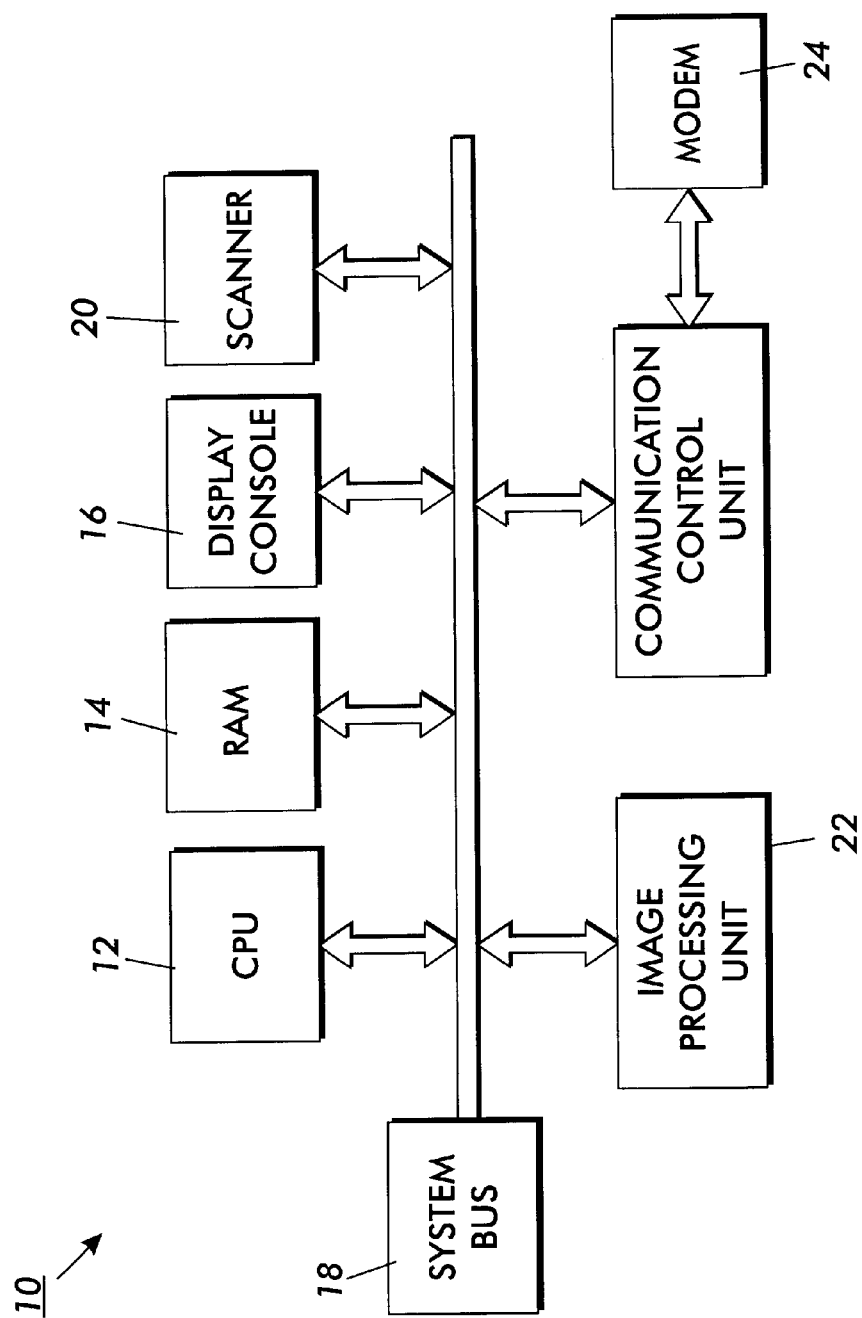
FIG. 1 is a generalized block diagram illustrating general aspects of a facsimile machine that may be used to practice the present invention.

Referring now to the drawings where the showings are for the purpose of describing an embodiment of the invention and not for limiting same, FIG. 1 is a block diagram showing structure of an embodiment of a facsimile (fax) apparatus 10 according to the present invention. Fax machine 10 includes a CPU 12 for executing controlling processes and facsimile transmission control procedures, a RAM 14 for controlling programs and a display console 16 with various buttons and/or switches for controlling the facsimile apparatus and LCDs or LEDs for reviewing the status of system operation. A scanner 20 is also included for acquiring an original image 28 and generating image data therefrom. Image processing unit 22 is included to perform encoding and decoding (compression and decompression) processes between an image signal and transmitted codes. While no specific location is required, the present invention will typically reside in image processing unit 22. Significantly for purposes of this invention, fax 10 includes or interfaces with a modem 24, which is a modulating and demodulating device that transmits and receives picture information over telephone lines to a compatible receiving device 26, such as another facsimile machine, a printer, computer terminal or similar apparatus. As indicated, scanning via sending fax 10 is one way in which this image data may be acquired. However, those skilled in the art will recognize that other ways such file generation using a computer and retrieving a digital file from storage are also acceptable.

The scanned image 28 is converted into image data which indicates the intensity of the light throughout the original image. In the preferred embodiment, this image data will be digital data represented as picture elements commonly known as "pixels" 120 (illustrated in FIG. 2) which represent the intensity of light at discrete locations in the image. For example, a spot that is covered with black ink will not reflect any light. The value of the pixel 120 will typically be a minimum value (i.e. 0) at that location. On the other hand, a spot that is completely uncovered by ink will reflect the color of the page on which the image resides. Assuming the sheet paper on which the image has been placed is white, the measured light intensity of the pixel 120 would be maximized at that spot. A range of pixel intensity values between 0 and 255 means that eight bits will be used to describe each pixel. Systems such as this are common in the art. Thus, the maximum pixel intensity value of often 255. Gray areas, such as those which represent color or black and white halftoned areas of the image would register a light intensity somewhere between 0 and 1.

Figure 2:
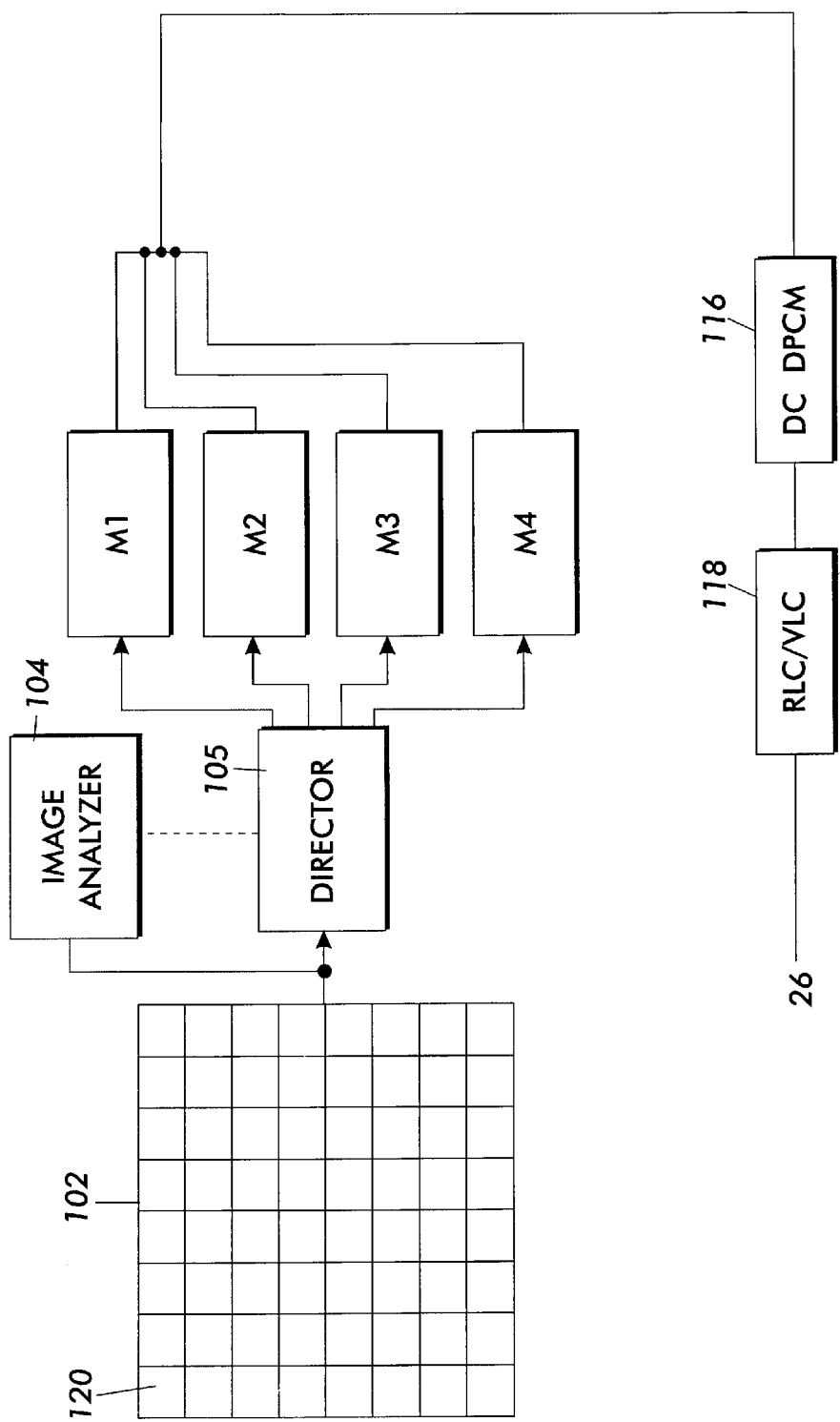
FIG. 2 contains a schematic illustration of the various elements of the present invention.

Referring now to FIG. 2, image data which describes the entire acquired image is segmented into image data blocks 102. JPEG, which provides image data blocks 102 in the form of 8×8 pixel matrices has shown to be very successful when used with the present invention, but the invention may be practiced with other compression techniques and using image data blocks 102 that have other dimensions. Those skilled in the art will recognize that a smaller or larger block size might be chosen when it is desired to preserve more or less image detail. In fact it should be noted that while the horizontal and vertical dimensions are identical in the embodiment of image data block 102 described here, this is not a requirement for practicing the present invention. For example, a non-square block might be chosen if the image was generated for a device possessing asymmetric resolutions in the vertical and horizontal directions.

The present invention allows sending fax 10 or similar device to maintain the transmission speed of the associated modem by compressing the image data at different speeds as the content of the image data varies between image data blocks 102.

Still referring to FIG. 2, the invention also includes several image processing modules M1–M4. While the invention will be described here with reference to four image processing modules, those skilled in the art will recognize that while at least two modules are required, fewer or more than four modules can be used depending upon how wide a variation in image reproduction accuracy is desired, and that the invention is not limited to the use of four modules. Modules M1–M4 will typically be compressors each of which processes the data at a different level of accuracy, thereby causing them to operate at a different rates of speed. For example, assuming that M1 produces the highest quality output, followed by M2, then M3, and that M4 has the greatest data loss, M1 will operate at the slowest speed, followed again by M2, then M3 and M4 will be the fastest. It should be noted that while all of the modules are capable of processing the image data, at least the fastest module must process it at a rate faster than the modem speed in order to prevent disconnects.

With continued reference to FIG. 2, the present invention also includes an image analyzer 104 which checks the content of each image data block 102 and selects the most appropriate module for processing. Data is then processed by the selected module and transmitted to receiving fax machine 26 by modem 24. More specifically, image analyzer 104 first determines whether the activity within the block—the amount of variation between the light intensity of the pixels contained therein—is high or low by mapping each block to the codeword that is linked to the image data that provides the closest match. High block activity means that image block 102 contains pictorial, multi-colored or other complex data, and that it should be reproduced by high quality producing module such as M1 or M2. For this type of data, processing performed by a lower quality outputting processor would probably have a severe negative impact on the visual appearance of the document. If block activity is low, it is most likely that the document contains text, blank areas, or areas that are covered with a single color. Reproducing this type of data using a processor that may produce a lower quality output is not likely to diminish the visual appearance of the document when viewed with only the human eye.

Vector quantization is an image processing technique in which K symbols that have N bits each are assigned to a single B bit codeword, where B <NK. For example sixteen eight-bit input strings might be assigned to a twelve-bit codeword. Thus, in this example, there will be enough codewords to represent only the 4096 ($2^{12}$) most representative blocks of the sixteen input symbols. Codewords that are produced by vector coding are usually stored or transmitted to another location or device, and are later decoded—mapped back—to K symbols.

In the present invention, several image data blocks 102 are mapped to a single codeword which is an approximation of the image data originally contained in input data block 102. Codewords have been pre-stored in a codebook in the storage, transmission, or receiving devices, and each codeword is associated with a set of pre-determined output image data. Thus, the codewords to which input data blocks 102 are mapped is that associated with data that will be closest to that contained in the input data blocks 102 according to any reasonable distance measure. This mapping also continuously indicates the level of activity within each block.

Codewords, codebooks and the entire mapping process are prepared in advance of operating the present invention. Thus, the only calculations that are required during operation are to compare input data blocks 102 to the codebook and select the appropriate codeword. Also, an indication of which module should be selected to process image data associated with it is attached to each codeword. For example, codewords to which pictorial, high activity image data blocks will be mapped will include data which indicates that module M1 should be selected to process that block. When simple, single color text is being analyzed, the selected codeword will indicate that module M4 should be chosen. Thus, each codebook is pre-stored with all necessary information and designations.

Figure 3:
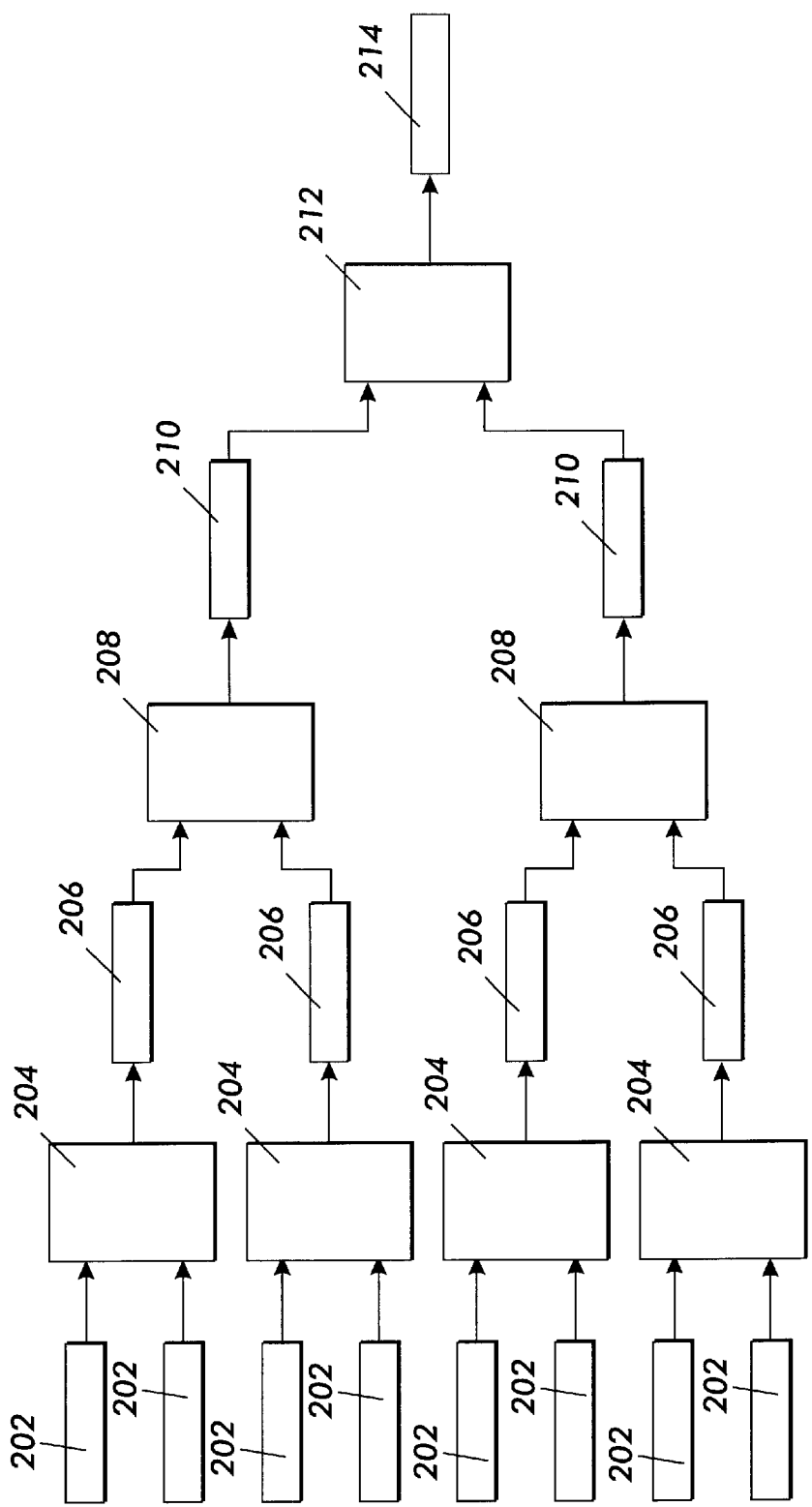
FIG. 3 contains a detailed illustration of one embodiment of the image processing compressors and their associated thresholds.
Figure 4:
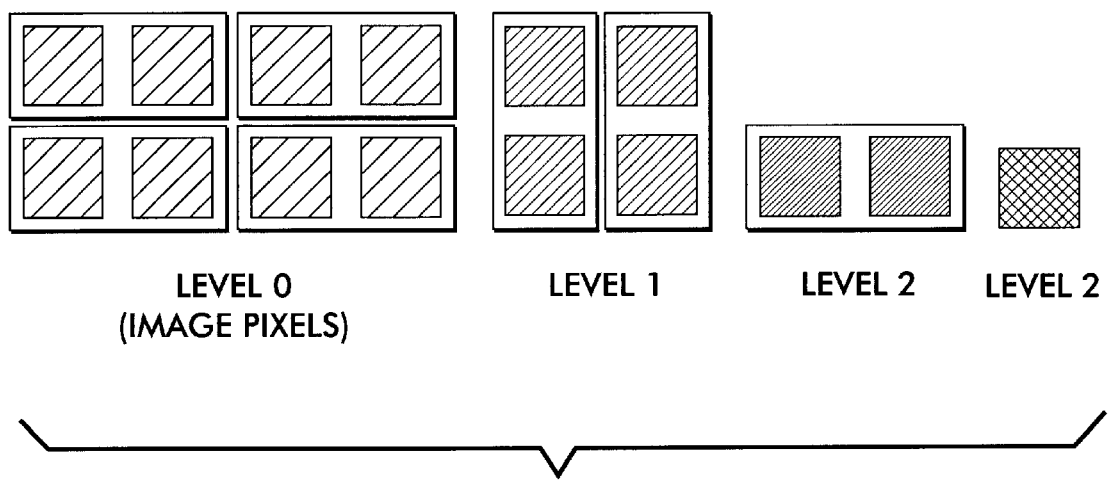
FIG. 4 contains a flow chart detailing the steps followed according to one embodiment of the decision logic device of the present invention.

Turning now to FIG. 3 for a general description Hierarchical Vector Quantization (HVQ), multiple N-bit symbols are mapped to a single B-bit codeword using a series of Look Up Tables (LUTs). As shown in the illustration, two N-bit symbols are mapped to an output codeword 206 at the first level using LUT 204, which has $2^{2N}$ entries. As shown, the total number of inputs is reduced by a factor of two at the each level. As stated earlier, the process is repeated until only one output remains, preferably by grouping codewords in a direction perpendicular to that used for the previous level as indicated in FIG. 4. Repeating the process results in the mapping of larger and larger blocks of data to a single codeword.

Figure 5:
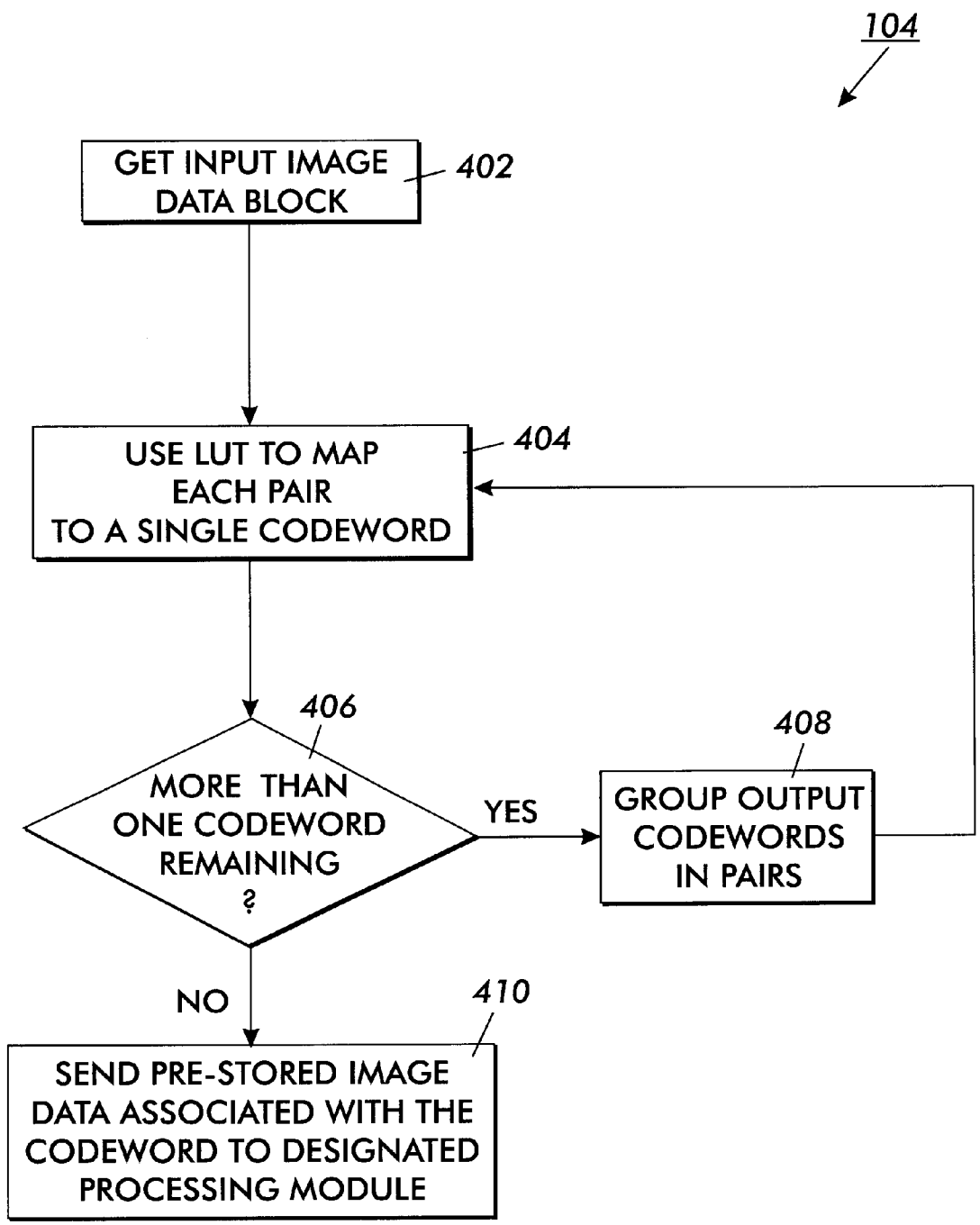
FIG. 5 contains a schematic illustration of an ordinary JPEG compression that may be practiced by the present invention.

FIG. 5 contains a flow chart showing the operating details of image analyzer 104. Beginning with step 402 input image data block 102 is input to image analyzer 104 which, in the preferred embodiment of the invention, is a system based on HVQ. Each pair of N-bit inputs 202 is mapped to a single codeword 206 using a look up table 204 as indicated in step 404.

Grouping the N-bit inputs 202 into pairs and outputting a single codeword 206 therefrom is the preferred embodiment, but use of this configuration is not required to practice the invention. For example, if the shape of the input block or the chosen number of bits, suggests that grouping three or more N-bit inputs 202 would be desirable, the invention could be adapted to accommodate this requirement. Further, if outputting multiple codewords 206 when more than two inputs 202 have been grouped is somehow advantageous, the invention could be adapted to perform this task as well. What is necessary to reap the full benefits of the present invention is for the number of inputs 202 to exceed the number of codewords 206. Thus, while mapping five N-bit inputs 202 to three N-bit codewords 206 would be desirable, mapping three N-bit inputs 202 to five N-bit codewords 206 would not typically be the best approach. Referring for a moment to FIG. 3, assuming that more than one codeword 206 has been generated by the initial stage division of image data block 102, the codewords produced in this first stage must be grouped in pairs and a second LUT 208 must be used to map each pair of resulting codewords 206 to a second stage codeword 210. This second mapping reduces the number of codewords 210 by a factor of two over the number of codewords 206 from the previous stage. The mapping pairs of codewords to a single codeword in the next level continues in hierarchical fashion until all N bit inputs that make up image data block 102 can be mapped to a single codeword at the last level. That is, LUT stages must continue to be applied hierarchically to each pair of output codewords from the previous stage until a single output codeword 212 is generated. Turning back to FIG. 5, is shown by the loop between steps 404, 406 and 408. It should be noted that a different LUT is used for mapping at each HVQ level. The LUTs at all levels above the first have been designed such that the inputs are codewords, rather than image data. The output from these higher level LUTs are codewords which represent the input codewords. Once the number of output codewords has been reduced to one, that final codeword 202 is used to represent an approximation of an entire image data block 102.

Each codeword can be associated with a set of predetermined image data, and the codeword also indicates the manner in which this pre-determined image data should be processed. Mapping of input blocks 202 to codewords 206 is performed by using LUT 204 to select the pre-determined image data set whose content is most similar to that of the input samples 202 being processed. Similarly, mapping of the output codewords to higher level codewords is performed by using LUTs 208 and 212 to select the predetermined image data sets that will appear the most similar according to any predetermined distance measure. Visual closeness when viewed with the human eye and some form of statistical analysis of the data contained in the block are two reasonable measurement criteria, but others are possible and the invention is not limited to this embodiment. Once the closest pre-determined image data set has been located, the image processing instructions associated with that data are used to select the module which will receive image data block 102. In other words, image data block 102 will be transmitted to the module that will process it according to the instructions provided by the pre-determined image data that is most closely matched to it. Therefore, after a few stages of HVQ-related LUT operations the output is a number which designates the module that should be used to compress the image data block, and thereby determine the desired compression method. If the pre-determined approximation contains high frequency information and detail, the image processing instructions will select the module with higher quality. If the approximation describes a block without much detail a lower quality module may be selected.

Figure 6:
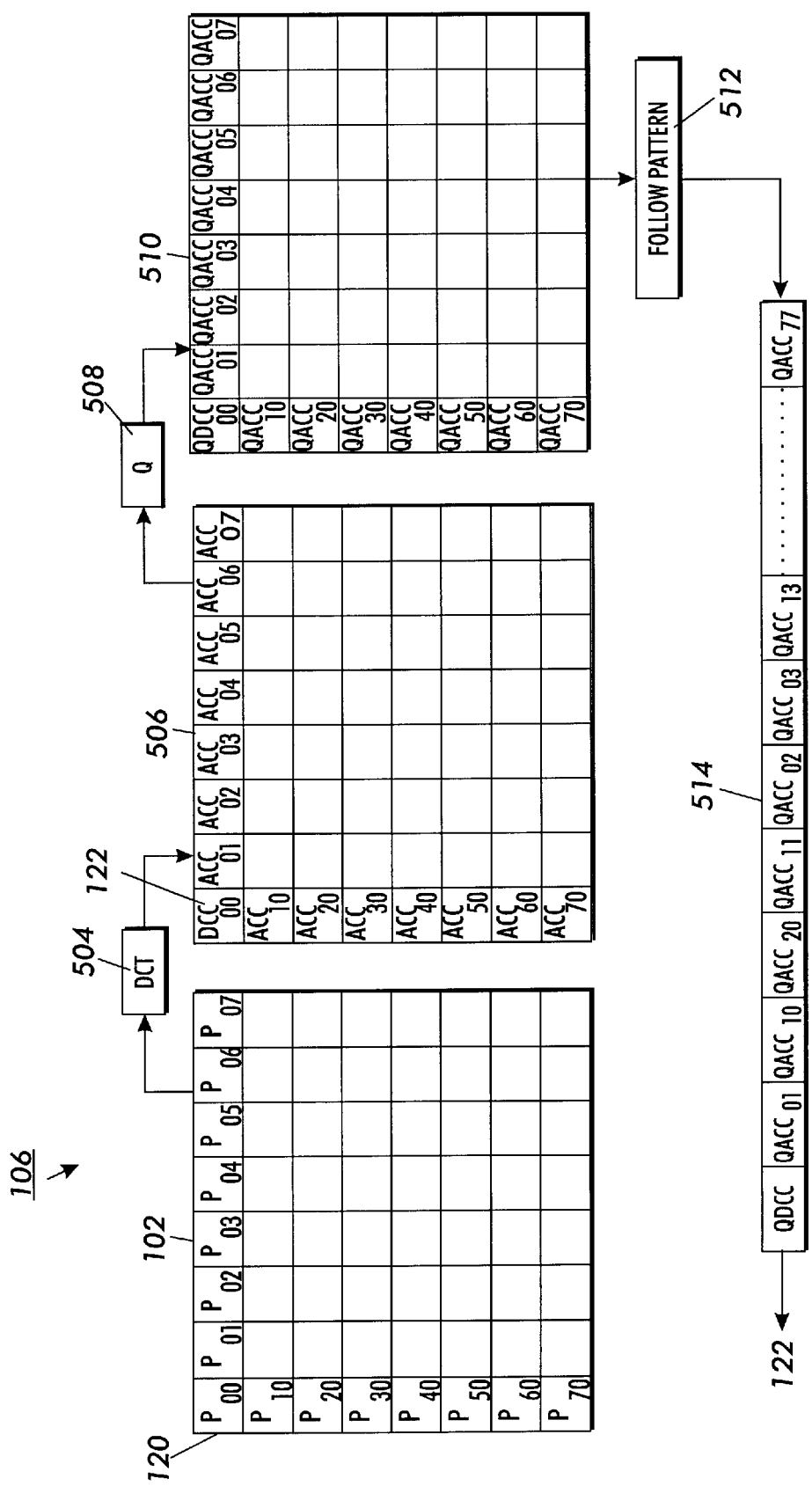
FIG. 6 contains a schematic illustration of a JPEG compression technique using approximate values as may be practiced by the present invention.

Referring now to FIG. 6, in the preferred embodiment, a standard JPEG compression will be applied to image data blocks 102 by one module (here described as M1) and will produce output data that has the highest image quality. Thus, once the digital image is separated into 8×8 image data blocks 102, image data block 102 is transformed using the discrete cosine transform (DCT) into a set 506 of 8×8 coefficients as indicated in step 504. The DCT coefficient with the lowest frequency is referred to as the DC coefficient (DCC), and the remaining coefficients are AC coefficients (ACCs). The DCC and ACCs are quantized—each coefficient is divided by a predetermined value referred to as the "step size" and rounded to a whole number at step 508 and then a selected pattern (usually a "zigzag") is followed through the 8×8 block of quantized coefficients 510 as indicated in step 512 to place the coefficients in a desired order in a one dimensional vector 514. The quantized DCC is typically the first value of the vector 514, and is represented differentially as the actual DCC value minus the DCC of the previous block.

Ordinary JPEG compression is completed with subsequent encoding of vector 514 into a bit stream through a sequence of Run Length Counting (RLC) operations which count the number of zero ACCs that reside in the path before a non-zero ACC. These RLC operations are combined with Variable Length Codes (VLC) which encode a symbol that includes a combination of the number of zeros preceding a non-zero ACC and the ACC amplitude. This encoding produces a compressed data stream which can be transmitted to a receiving fax machine or other device 26 over communication lines.

In another embodiment of the invention module M4, which will produce the lowest quality output, will perform only the first step of the JPEG compression. That is, image data block 102 will be subjected to DCT. After that, only the DCC will be quantized. It should be noted that while this image data will have the lowest image quality, it will be produced at the fastest rate.

In yet another embodiment of the invention, the remaining modules, illustrated here as M2 and M3 will perform JPEG compression on "reduced" data sets-data that has been reduced in size from the originally provided 8×8 block. Generally speaking, both M2 and M3 generate approximation data which provide estimated values of the pixels in image data block 102. Next, output image data is derived from the approximation data, and the derived output image data prepared for subsequent transmission via modem 24. Because the output data is derived from approximation data, these modules produce output data that is less accurate—lower quality—than that produced by module M1. Generating the approximation data requires partitioning the image data block into a plurality of image data sub-blocks and representing each image data sub-block as a single value in an approximation data block. Deriving output image data from this generated data is performed by applying standard JPEG to the set of approximation data.

Figure 7:
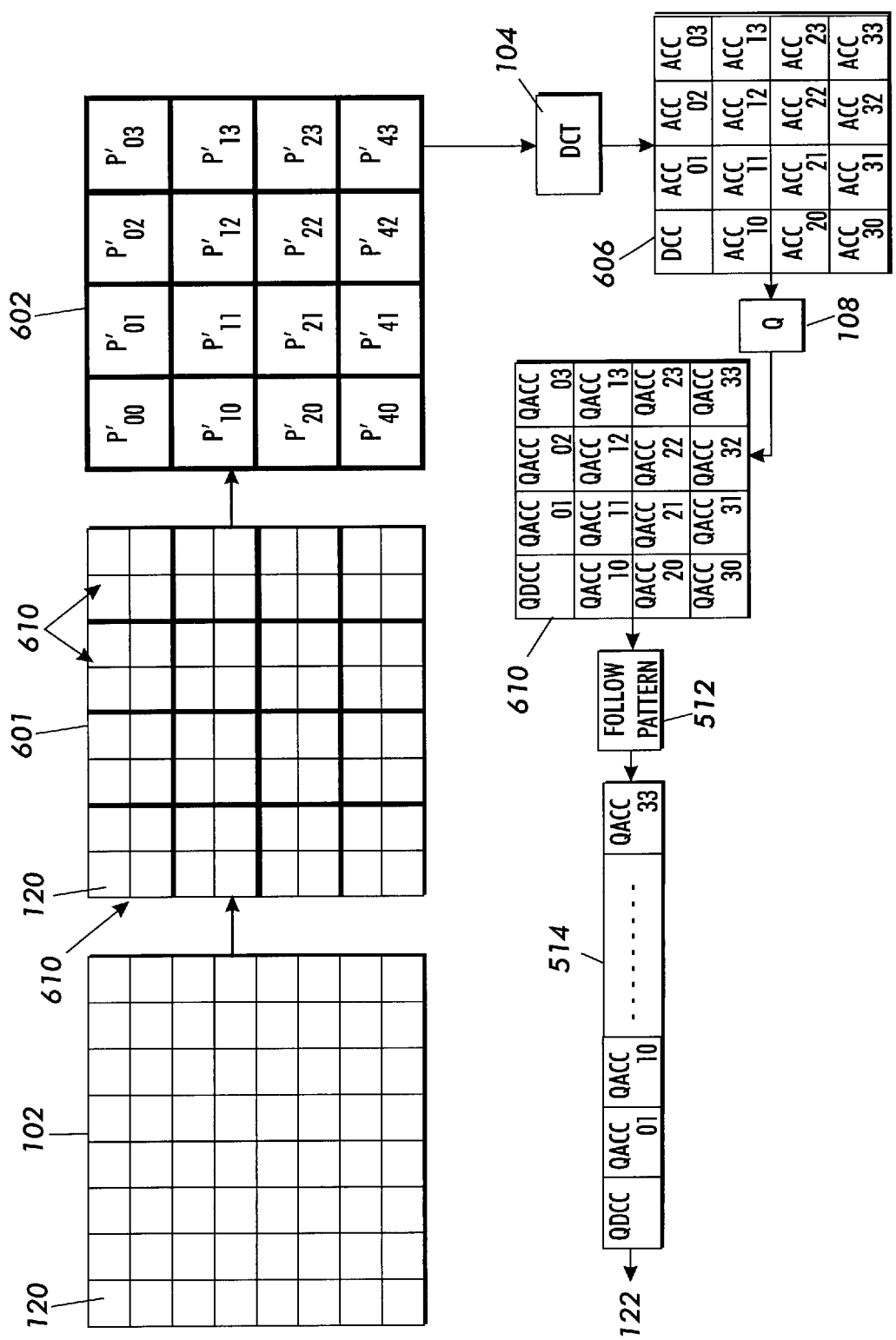
FIG. 7 contains a schematic illustration of another JPEG compression technique using approximate values as may be practiced by the present invention.

Turning to FIG. 7 for a detailed description of M2, image data block 102 is partitioned into sub-blocks 610. Here, where an 8×8 image data block 102 has been provided, the preferred embodiment of the invention includes partitioning image data block 102 into 4×4 sub-blocks 610 each having 4 pixels 120 arranged in a 2×2 pattern. Approximate values for each sub-block are then generated by representing each sub-block 610 with a single value in an approximation data block 602. Those skilled in the art will recognize that these single value approximations can be obtained in many ways, such as averaging or adding the four pixels 120 in the sub-block, or by using the minimum, maximum, median or some other designated value. The remainder of the image processing by M2 is performed using ordinary JPEG compression. That is, approximation data block 602 is transformed at 604 into a block of coefficients 606 using the DCT. Coefficient block 606 is then quantized at 108, and quantized coefficient block 610 is arranged into a one dimensional vector 514 which is encoded into a bit stream and sent to multiplexer 122 or a similar single output selecting device for transmission to a receiving fax machine or other device 26.

Figure 8:
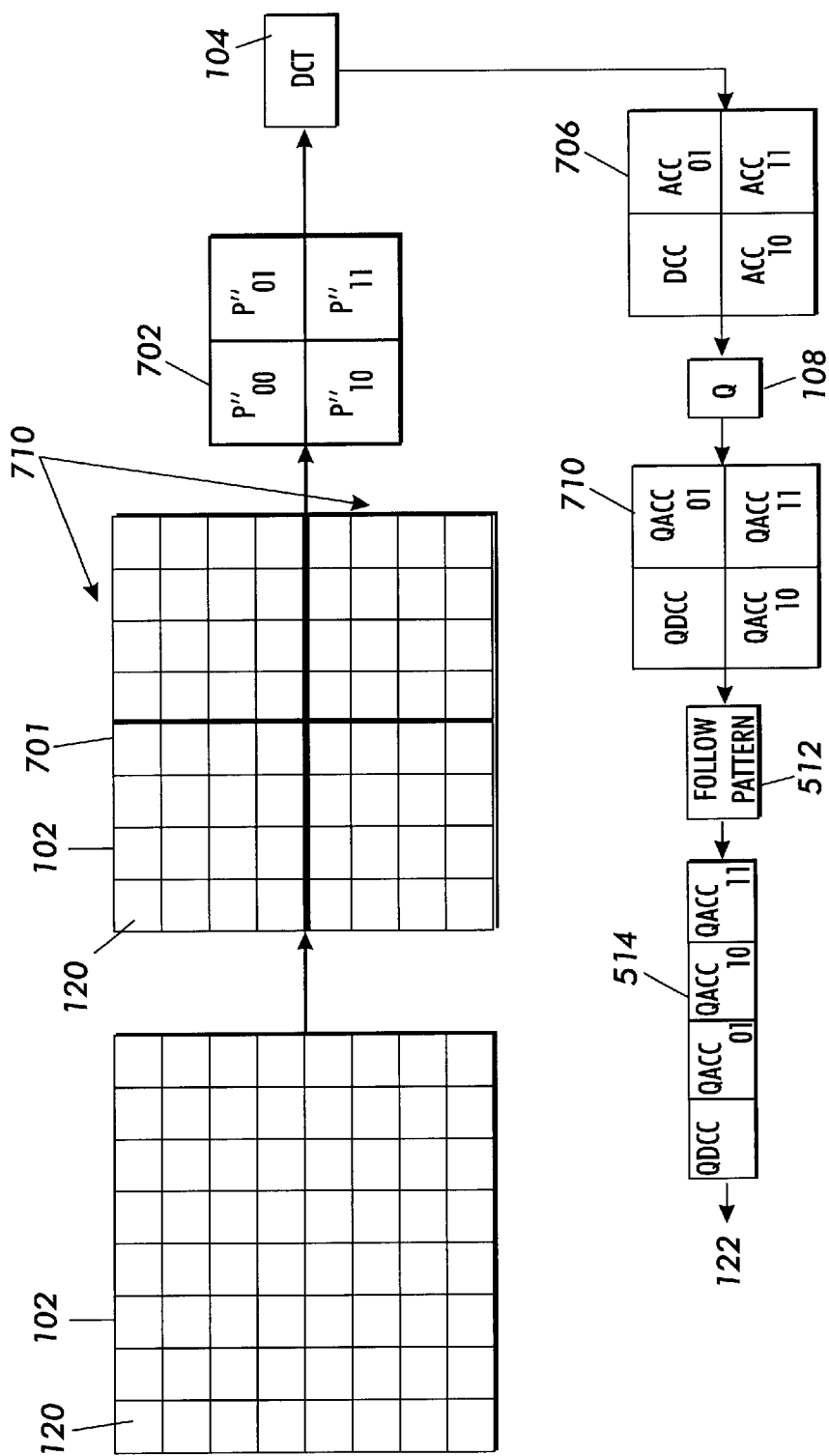
FIG. 8 contains a schematic illustration of the a second embodiment of the present invention.

Referring now to FIG. 8, M3 operates very similarly to M2 with the difference being the magnitude of the approximation that takes place, and therefore the level of reduction in output image quality. As shown, image data block 102 is again partitioned into sub-blocks 710, but here the 8×8 image data block 102 is partitioned into 2×2 sub-blocks 710 each having 16 pixels 120 arranged in a 4×4 pattern. This approximation provides for less accurate image reproduction than the embodiment described above with reference to FIG. 6, since more data loss can take place. On the other hand, processing takes place at an increased processing rate. As indicated earlier, image processing by module M3 will be at a higher image quality level than M4, but processing will take longer. Approximate values for each sub-block are generated by representing each sub-block 710 with a single value in an approximation data block 602. Approximation data block 702 is transformed at 704 into a block of coefficients 706 using the DOT. Coefficient block 706 is then quantized at 108, and quantized coefficient block 710 is arranged into a one dimensional vector 514 which is encoded into a bit stream and sent to a receiving fax machine 26.

As explained earlier, one advantage of the present invention is the ability to tailor the size and shape of the blocks and sub-blocks to the needs of the user. Thus, image data blocks 102 can be locked for transmission to module M1 or possibly module M2 when it is known that the entire image being transmitted has a lot of fine detail and too much data would be lost with approximation. On the other hand, image data blocks 102 could be locked for transmission to module M3 or M4 when the original image includes only text on a plain paper background. It should be noted again here that processing by module M4, which produces the lowest image quality output, is not necessarily undesirable. In fact, this module should be used heavily when the original image contains smooth image data or blank constant areas, because fewer bits will be transmitted when the image has been processed. In other words, image quality will not be lost since there is less image data to process, and the approximations that occur in module M4 will produce fairly accurate results.

It is, therefore, apparent that there has been provided in accordance with the present invention, a method and apparatus for analyzing image data to efficiently use multiple transforms and enhance image data transmission that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of improving the speed and efficiency of electronic data transmission, comprising the steps of:
    a) acquiring input image data which represents the light intensity of an image;
    b) segmenting said input image data to form a plurality of image data blocks;
    c) analyzing at least one of said image data blocks to determine its image data content;
    d) providing a single stage of plural image processing modules, wherein each image processing module processes image data at a different image quality level;
    e) selecting, based on the determined image content, a single image processing module among the plurality of image processing modules for receipt of the image data block;
    f) transmitting said image data block to the selected image processing module; and
    g) processing said received image data block in said selected image processing module;
    wherein said module selecting step further comprises the steps of:
        1) obtaining the image data block;
        2) mapping said image data block to a single codeword using at least one look up table; and
        3) transmitting said image data block to the module as designated by said single codeword.

2. The method of improving the speed and efficiency of electronic data transmission as claimed in claim 1, wherein said mapping step further comprises:
    a) dividing said input data block into a plurality of samples;
    b) grouping said samples in pairs and representing each sample pair with one codeword using a look up table; and
    c) linking each pair of said codewords to a next level codeword in hierarchical fashion using a look up table at each level until said image data block is represented by a single codeword.

3. The method of improving the speed and efficiency of electronic data transmission as claimed in claim 1, wherein said processing step further comprises:
    a) transforming said image data block into a block of coefficients;
    b) quantizing said coefficient block;
    c) arranging said quantized coefficient block into a one dimensional vector; and
    d) encoding said one dimensional vector into a bit stream, thereby producing a processed image data block.

4. The method of improving the speed and efficiency of electronic data transmission as claimed in claim 1, wherein said processing step further comprises:
    a) generating approximation data which provides an estimated value of said light intensity in said image data block; and
    b) deriving output image data from said approximation data.

5. The method of improving the speed and efficiency of electronic data transmission as claimed in claim 4, wherein said approximation data generation step further comprises:
    a) partitioning said image data block into a plurality of image data sub-blocks; and
    b) representing each image data sub-block as a single value in an approximation data block.

6. The method of improving the speed and efficiency of electronic data transmission as claimed in claim 4, wherein said output image data derivation step further comprises:
    a) transforming said approximation data into a block of coefficients;
    b) quantizing said coefficient block;
    c) arranging said quantized coefficient block into a one dimensional vector; and
    d) encoding said one dimensional vector into a bit stream, thereby producing said output image data.

7. The method of improving the speed and efficiency of electronic data transmission as claimed in claim 5, wherein said partitioning step further comprises dividing said image data block into sixteen image data sub-blocks, wherein four sub-blocks extend in a horizontal direction and four sub-blocks extend in a vertical direction.

8. The method of improving the speed and efficiency of electronic data transmission as claimed in claim 5, wherein said partitioning step further comprises dividing said image data block into four image data sub-blocks, wherein two sub-blocks extend in a horizontal direction and two sub-blocks extend in a vertical direction.

9. An apparatus for improving the speed and efficiency of electronic data transmission, comprising:
   a) a segmenter which divides image data into a plurality of input image data blocks, wherein said image data corresponds to the light intensity of an original image;
   b) a single stage of plural image processing modules, wherein each image processing module processes image data at a different image quality level, the plurality of image processing modules communicating with said segmenter, wherein any one of said image processing modules may process one of said segmented image data blocks; and
   c) an image analyzer communicating with said segmenter and with said plural image processing modules to designate one of said image processing modules for processing of a segmented image data block based upon a content of said segmented image data block, wherein each image processing module processes image data at a different image quality level;
   d) a director for transmitting the segmented image data block to a single image processing module among the plurality of image processing modules for processing the segmented image data block; and
   e) an input data mapping device which maps the image data block to one codeword using a look up table;
   wherein the image data block is transmitted by the director to a image processing module designated by said single codeword.

10. The apparatus for improving the speed and efficiency of electronic data transmission as claimed in claim 9, wherein said input data mapping device further comprises:
    a) a segmenter which divides said input data block into a plurality of samples;
    b) a binder which groups said samples in pairs and represents each sample pair with one codeword using a look up table; and
    c) a codeword mapping device which links pairs of said codewords to a next level codeword in hierarchical fashion using a look up table at each level until said image data block is represented by a single codeword.

11. The apparatus for improving the speed and efficiency of electronic data transmission as claimed in claim 10, wherein at least one of said modules further comprises:
    a) a converter which transforms said image data block into a block of coefficients;
    b) a quantizer which divides each coefficient in said coefficient block by a predetermined value and rounds a resulting value to a whole number;
    c) a sequencer which places said coefficients in said quantized coefficient block into a one dimensional vector; and
    d) an encoder which converts said one dimensional vector into a bit stream.

12. The apparatus for improving the speed and efficiency of electronic data transmission as claimed in claim 10, wherein at least one of said modules further comprises:
    a) an approximation data generator which provides an estimated value of said light intensity in said image data block; and
    b) output image data generator which derives output image data from said approximation data.

13. The apparatus for improving the speed and efficiency of electronic data transmission as claimed in claim 12, wherein said approximation data generator further comprises:
    a) a partitioner which divides said image data block into a plurality of image data sub-blocks; and
    b) a simplifier which represents each image data sub-block as an approximate value in an approximation data block.

14. The apparatus for improving the speed and efficiency of electronic data transmission as claimed in claim 12, wherein said output image data generator further comprises:
    a) means for transforming said approximation data into a block of coefficients;
    b) means for quantizing said coefficient block;
    c) means for arranging said quantized coefficient block into a one dimensional vector; and
    d) means for encoding said one dimensional vector into a bit stream, thereby producing said output image data.

15. The apparatus for improving the speed and efficiency of electronic data transmission as claimed in claim 13, wherein said segmenter further comprises means for dividing said image data block into sixteen image data sub-blocks, wherein four sub-blocks extend in a horizontal direction and four sub-blocks extend in a vertical direction.

16. The apparatus for improving the speed and efficiency of electronic data transmission as claimed in claim 13 wherein said segmenter further comprises means for dividing said image data block into four image data sub-blocks, wherein two sub-blocks extend in a horizontal direction and two sub-blocks extend in a vertical direction.

* * * * *